G. W. DUNHAM.
RADIATOR.
APPLICATION FILED MAY 28, 1910.
1,022,662.
Patented Apr. 9, 1912.
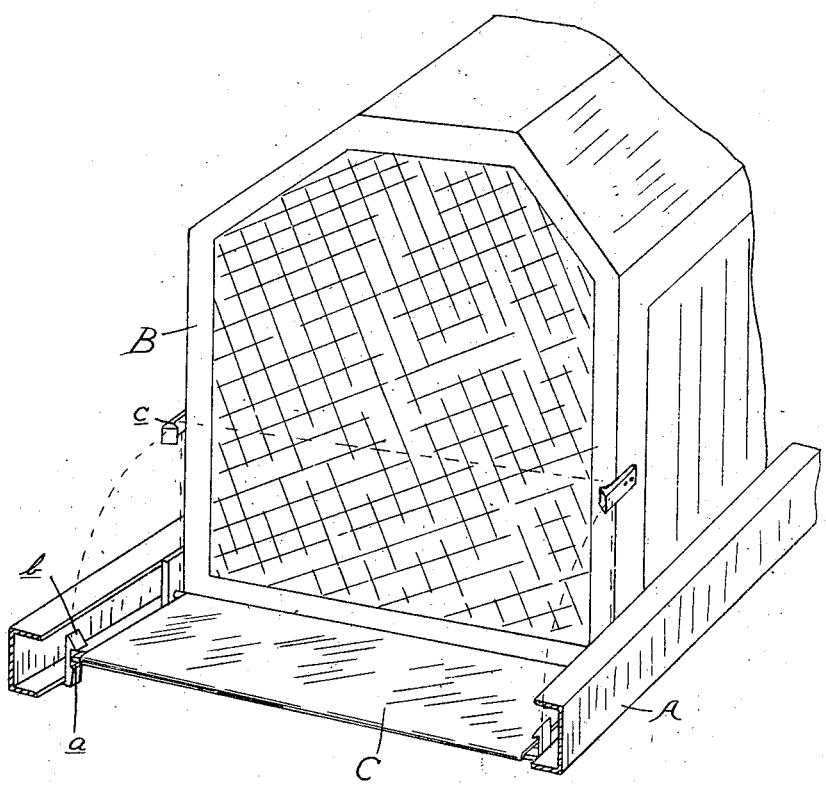
Witnesses
Inventor
George W. Dunham
By Whittemore Hulbert + Whittemore
Attys

UNITED STATES PATENT OFFICE.

GEORGE W. DUNHAM, OF DETROIT, MICHIGAN, ASSIGNOR TO THE CHALMERS MOTOR COMPANY, OF DETROIT, MICHIGAN, A CORPORATION OF MICHIGAN.

RADIATOR.

1,022,662.  Specification of Letters Patent.  Patented Apr. 9, 1912.

Application filed May 28, 1910. Serial No. 563,891.

*To all whom it may concern:*

Be it known that I, GEORGE W. DUNHAM, a citizen of the United States of America, residing at Detroit, in the county of Wayne and State of Michigan, have invented certain new and useful Improvements in Radiators, of which the following is a specification, reference being had therein to the accompanying drawings.

The invention relates generally to radiators for explosive engines, and has for one of its objects the provision of means for varying the area of its cooling surface, it being frequently desirable in cold weather where the radiator is exposed to the elements to reduce the surface, thus allowing the water to warm and providing in consequence a better running motor.

A further object is the provision of a guard for the radiator when used on motor propelled vehicles adapted to protect the surface from flying mud, and a still further object is the provision in motor car construction of simple and inexpensive means for accomplishing either of the above-mentioned results, preferably through the instrumentality of a single device that may be readily adjusted to accomplish the object desired.

In the drawings illustrating my invention,—the single figure is a sectional perspective view illustrating an embodiment of my invention.

For the purpose of explanation, I have shown the invention as embodied in motor car construction, and in its preferred form, wherein a combination shield and guard is employed, preferably in the form of a hinged plate.

In the drawings referred to, the reference-letter A represents the usual frame of a motor car, and B the radiator of any approved construction, and pivoted to the frame sides at the lower edge of the radiator front is a combination shield and guard C in the form of a plate capable of being turned up, as shown in dotted lines, in parallelism with the front face of the radiator, in which position it constitutes the guard, and adapted to extend in a lateral forward direction shown in the full lines, wherein it performs the function of a mud guard.

When in its extended position, the outer corner portions of the plate rest upon shoulders *a* upon spring clips *b*, which latter serve to retain the plate in its lowered position. Similar spring clips *c* upon the radiator sides retain the plate in its vertical position, where it cuts off the lower portion of the cooling surface.

What I claim as my invention is—

1. In a motor propelled vehicle, the combination of a radiator, and a combined mud guard and shield for the front of the radiator comprising a member normally horizontally arranged forwardly of the radiator and adjustable independently of the radiator into substantially parallelism with the face thereof, and means for retaining said member in its different positions of adjustment.

2. In a motor propelled vehicle, the combination of a radiator and a combined mud guard and shield for the front of the radiator comprising a plate pivoted adjacent the lower front edge of the radiator upon a horizontal axis, said plate being normally arranged forwardly of the radiator in a horizontal plane and adjustable independently of the radiator into substantially parallelism with the front face thereof, for the purpose described.

3. In a motor propelled vehicle, the combination of a radiator, spaced side sills supporting said radiator and having portions extending forwardly thereof, a plate pivoted adjacent the lower front edge of the radiator upon a horizontal axis, normally horizontally arranged intermediate the extensions of the side sills and adjustable into substantially parallelism with the front face of the radiator, and locking devices upon the radiator and the side sills for retaining the plate in its adjusted positions.

In testimony whereof I affix my signature in presence of two witnesses.

GEORGE W. DUNHAM.

Witnesses:
T. P. CHASE,
CARL E. GREGORY.